United States Patent
Xu et al.

(10) Patent No.: US 6,501,732 B1
(45) Date of Patent: Dec. 31, 2002

(54) SYSTEM AND METHOD FOR CONTROLLING DATA FLOW IN A WIRELESS NETWORK CONNECTION

(75) Inventors: Yingchun Xu, Buffalo Grove, IL (US); Karl Freter, Wheaton, IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/257,759

(22) Filed: Feb. 25, 1999

(51) Int. Cl.⁷ .................................................. H04J 1/16
(52) U.S. Cl. ....................................... 370/235; 370/411
(58) Field of Search .............................. 370/235, 216, 370/252, 254, 229, 230, 231, 232, 233, 234, 236, 237, 411–419, 420, 395.21, 395.41, 401, 428, 351, 352, 347, 342, 441, 442, 468; 340/825.5, 825.01, 825.03, 827; 379/221

(56) References Cited

U.S. PATENT DOCUMENTS

| | | |
|---|---|---|
| 4,991,169 A | 2/1991 | Davis et al. |
| 5,253,248 A * | 10/1993 | Drarida et al. ............... 370/228 |
| 5,418,842 A | 5/1995 | Cooper |
| 5,491,565 A | 2/1996 | Naper |
| 5,519,707 A | 5/1996 | Farinacci et al. |
| 5,528,595 A | 6/1996 | Walsh et al. |
| 5,577,105 A | 11/1996 | Baum et al. |
| 6,198,728 B1 * | 3/2001 | Hulyalkar ..................... 370/252 |
| 6,304,574 B1 * | 10/2001 | Schoo et al. ................. 370/466 |

FOREIGN PATENT DOCUMENTS

WO    WO 97/25824    7/1997

OTHER PUBLICATIONS

Sano, T. et al., *Monitoring–Based Flow Control for Reliable Multicast Protocols, and its Evaluation*, IEEE International Performance, Computing and Communications Conference, pp. 403–409 (1997).

Floyd, S. et al., *Random Early Detection Gateways for Congestion Avoidance*, IEEE/ACM Transactions on Networking, vol. 1, No. 4, pp. 397–413 (Aug. 1, 1993).

International Search Report for PCT Application Serial No. PCT/US00/04627, dated Jul. 11, 2000.

\* cited by examiner

Primary Examiner—Dang Ton
(74) Attorney, Agent, or Firm—McDonnell Boehnen Hulbert & Berghoff

(57) ABSTRACT

A system and method for controlling the flow of data from a data network to a mobile user over a wireless link. A data flow controller is provided in an inter-working gateway between the mobile switch center of the wireless network and the data network. The data flow controller determines the amount of available space in the mobile switch center buffer and ensures that the amount of data sent to the mobile switch center is no greater than the available buffer space. The data flow controller continually updates the available buffer space by determining the amount of data sent periodically to the mobile user according to a given airlink data rate. The data flow controller includes a buffer to store any remaining data that could not be sent to avoid overflowing the mobile switch center buffer.

20 Claims, 7 Drawing Sheets

FIG. 6

```
DATA STRUCTURE FOR EACH CALL:
STRUCT CALL_CONTEXT (
        INT SWITCH_BUFFER_SIZE;   /* NUMBER OF BYTES */
        INT AIR_LINK_RATE;   /* BYTES/PER SECONDS */
        INT QUOTAS_LEFT;   /* NUMBER OF BYTES LEFT FOR THE CALL */
}
AT INITIALIZATION TIME, THE FOLLOWING FUNCTION WILL BE CALLED:
INIT (CALL_HANDLE X, INT AIR-LINK RATE, INT SWITCH_BUFFER_SIZE)
{
        X->SWITCH BUFFER_SIZE - SWITCH_BUFFER_SIZE;
        X->AIR_LINK_RATE - AIR_LINK_RATE;
        X->QUATAS_LEFT = SWITCH_BUFFER-SIZE;
        RETURN;
}
EVERY 100 MILLISECONDS, THE FOLLOWING FUNCTION WILL BE CALLED TO UPDATE
THE QUATAS OF A CALL.
QUATA_UPDATE(CALL_HANDLE X)
{
        IF      (X->QUATAS < X->SWITCH_BUFFER_SIZE){
                X->QUATAS += X->AIR_LINK_SPEED * 100 / 1000;
                IF      (X->QUATAS > X->SWITCH_BUFFER_SIZE)
                        X->QUATAS = X->SWITCH_BUFFER_SIZE;
        }
        /* CHECK ANY BUFFERED DATA */
        IF (BUFFERED_DATA_EXIST)
                SEND_DATA (X, BUFFERED_DATA_POINTER, BUFFERED_DATA_SIZE);
        RETURN;
}
THE FOLLOWING FUNCTION WILL BE CALLED DURING DATA TRANSMISSION:
SEND_DATA(CALL_HANDLE X, CHAR *DATE_TO_BE_SENT, INT DATA_SIZE)
{
        IF (DATA_SIZE > - X->QUATAS && X->QUATAS > 0) {
                /* SEND WHATEVER POSSIBLE AND BUFFERING WHATEVER LEFTED */
                SENDDOWN (DATA_TO_BE_SENT, X->QUATAS);
                BUFFERING_DATA(DATA_TO_BE_SENT + X->QUATAS, DATA_SIZE - X->QUATAS);
                X->QUATAS = 0;
        }
        ELSE IF (DATA SIZE < X->QUATAS && X->QUATAS > 0) {
                /* SEND ALL THE DATA DOWN */
                SENDDOWN(DATA_TO_BE_SENT, DATA_SIZE);
                X->QUATAS = X->QUATAS - DATA_SIZE;
        }
        ELSE {
                /* THERE IS NO QUATA FOR THE CALL, BUFFERING ALL THE DATA */
                BUFFERING_DATA(DATA_TO_BE_SENT, DATA_SIZE);
        }
        RETURN;
}
```

SYSTEM AND METHOD FOR CONTROLLING DATA FLOW IN A WIRELESS NETWORK CONNECTION

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

A. Field of the Invention

The present invention relates to the field of data communications, and more particularly to the field of communicating digital data between a wireless user and a computer network.

B. Background of the Invention

Network access servers that provide local or wide area network access for remote users dialing in over the public switched telephone network are known in the art. These devices are available from 3Com Corporation, the assignee of the present invention. The Total Control Network Enterprise Hub from 3Com is a representative network access server. It is described in U.S. Pat. No. 5,577,105 of Baum et al., entitled "Telephone Call Switching and Routing Techniques for Data Communications," and U.S. Pat. No. 5,528,595 of Walsh et al., entitled "Modem Input/Output Signal Processing Techniques." The Walsh et al. and Baum et al. patents are both fully incorporated by reference herein.

The network access server described in the Walsh et al. and Baum et al. patents provides an interface to a multiplexed digital telephone line, a plurality of modems for performing signal conversions for the data from the remote users, and a network interface for transmitting demodulated data from the modems onto a local or wide area network. A high speed midplane bus structure comprising a time division multiplexed bus provides a signal path between the channels of the telephone line and the modems. The high speed midplane also includes a parallel bus that couples the modems to the network interface.

This network access server architecture in a single chassis has proven to be very popular in a variety of applications, particularly corporate network access. The network access server is also particularly popular with Internet service providers for land-based Internet users. With a single network access server, the Internet service provider can handle a large number of simultaneous Internet access calls and provide full duplex communication between the multiple remote users and host computers on the Internet.

The technology for Internet access for wireless users is now emerging. There are two competing standards for wireless service, CDMA (Code Division Multiple Access, described in the standard documents IS-130 and IS-135, incorporated by reference herein) and TDMA (Time Division Multiple Access, described in standards document IS-99, also incorporated by reference herein). These standards specify standards and guidelines for digital wireless communications for both voice and data. The two standards differ in how digital data from multiple users are multiplexed on the radio interface.

In accordance with both wireless technologies, a wireless user transmits data to a mobile switching center. The mobile switching center provides connectivity to the public switched telephone network, certain multiplexing and control function, and switching functions for the wireless users. Multiplexed digital data from a plurality of remote wireless users is then capable of being transmitted via high-speed communication formats (such as Frame Relay) to communication elements in the public switched telephone network.

The mobile switch center may also be connected to a network access server to provide Internet access and corporate network access to wireless users over a wireless link. The network access server provides for the functions needed for terminal equipment connected to a TDMA or CDMA mobile telephone to inter-work with terminal equipment connected to the public switched telephone network and the Internet.

The mobile switch centers provide buffers to store digital data that is to be multiplexed for distribution to the wireless users via a plurality of base stations. The mobile switch centers currently available on the digital wireless telephone system were originally designed for voice communication through telephone handsets. The volume of signal exchanged between handsets may not require extensive buffering along the signal path. However, a data network communicating via high-speed links may transmit a large amount of digital data to wireless users. The buffers in the mobile switch center, which have been designed to communicate voice signals, may not have the capacity to store the digital data sent from the data network. This may result in overflow and the loss of data.

Connections to the data network that use the Transport Control Protocol (TCP) include a built-in flow control mechanism that may alleviate some buffer overflow. The TCP flow control mechanism uses a TCP receiving window in the mobile device to control the flow of data received. If the receiving window is larger than the buffer in the mobile switch center, the TCP flow control mechanism is useless.

It would be desirable to control the flow of data to a wireless user from a data network to prevent buffer overflows in the mobile switch center.

SUMMARY OF THE INVENTION

In view of the above, a system is provided for controlling data flow to a wireless user over a wireless network. The system includes an inter-working gateway connected to a data network. The inter-working gateway receives a plurality of network data transmissions having a network data size from the data network for sending to the wireless user. The system includes a switch center connected to the inter-working gateway. The switch center receives a plurality of gateway data transmissions having a gateway data size from the inter-working gateway for sending to the wireless user. The switch center includes a switch buffer for storing data from the plurality of gateway data transmissions. The switch buffer has a switch buffer size. A wireless link is included for communicating a plurality of switch data transmissions, each having a switch data size, between the wireless user and the switch center. A data flow controller in the inter-working gateway controls the gateway data size of the gateway data transmissions by determining an available buffer size in the switch buffer. The gateway data size is less than or equal to the available buffer size.

In another aspect of the present invention, an improved network access server is provided for connecting to a data network and to a mobile switch center in a wireless network. The switch center is connected to at least one wireless user via a wireless link. The network access server receives a network data transmission from the data network and sends a gateway data transmission to the switch center. The switch center receives the plurality of gateway data transmissions and sends a plurality of switch data transmissions to the wireless user. The wireless link transmits data at an airlink data rate. The mobile switch center includes a switch buffer for storing the switch data transmissions being sent to the wireless user. The switch buffer has a switch buffer size.

The improvement to the network access server includes a data flow controller for determining a gateway data size of the gateway data transmissions that it sends to the switch center. The data flow controller determines the gateway data size by determining an available buffer size in the switch buffer. The data flow controller ensures that the switch data size is less than or equal to the available buffer size.

In yet another aspect of the present invention, a method is provided for controlling the data flow between a switch center and a wireless user in a wireless network that receives data from a data network. According to the method, a plurality of network data transmissions is received at an inter-working gateway. A gateway data size is determined for transmitting a gateway data transmission. The gateway data size is determined by determining an available buffer size for a switch buffer in the switch center. The gateway data size is less than or equal to the available buffer size. The gateway data transmission of the gateway data size is then sent to the switch center. The available buffer size is periodically adjusted.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 6 is computer program code for performing steps shown in the flowcharts of FIGS. 4A through 4C.

DETAILED DESCRIPTION OF THE PREFERRED EMBODIMENT

The following description incorporates by reference U.S. patent application Ser. No. 08/887,313 "Network Methods, Including Direct Wireless to Internet Access" (filed Jul. 3, 1997).

Figure 1:
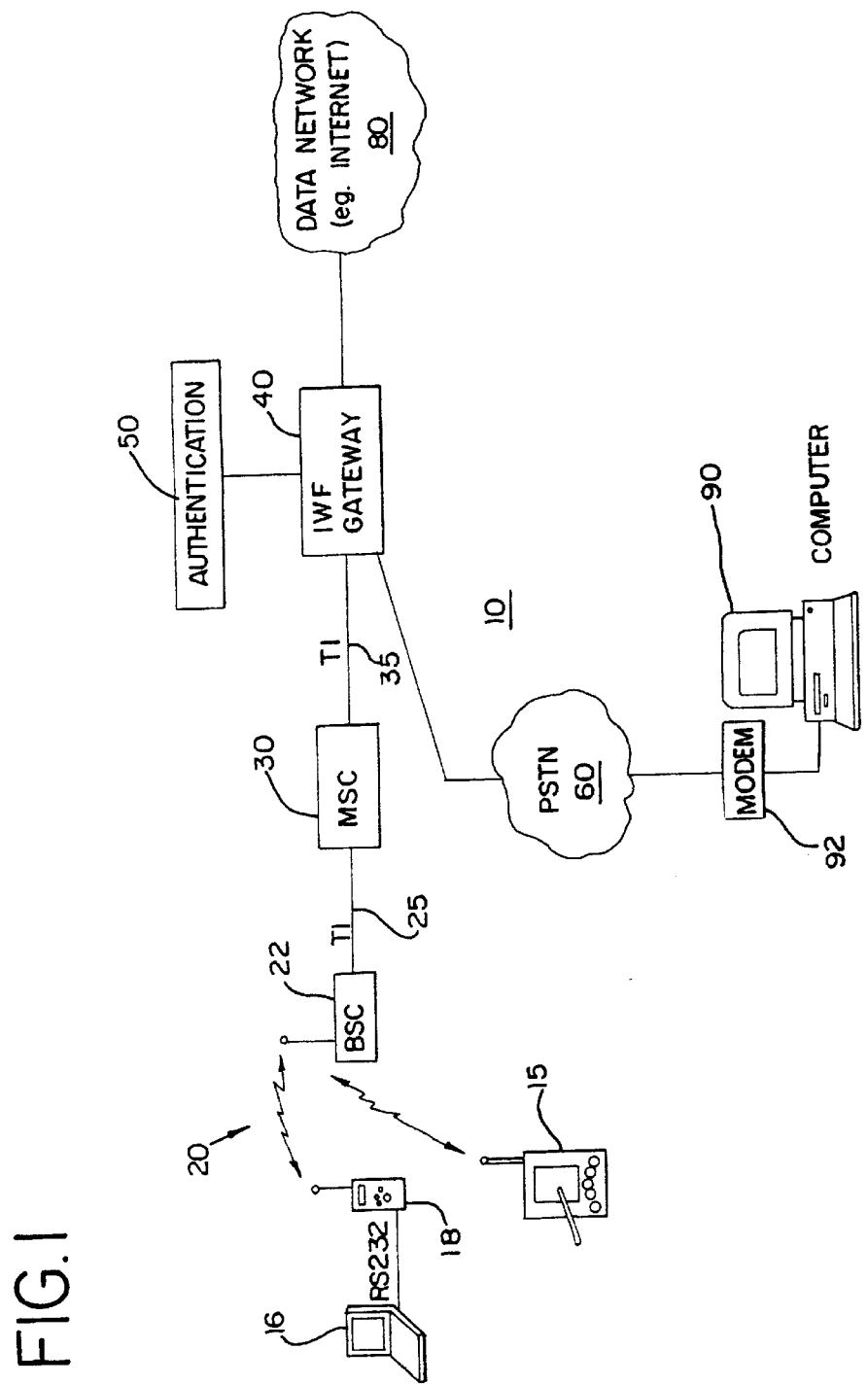
FIG. 1 is an illustration of an example of a network access system for wireless users in accordance with embodiments of the present invention.

FIG. 1 is an illustration of a preferred network access system 10 for users of wireless equipment 15, 16 that can be used to practice the invention. Remote devices such as a laptop computer 16 with a wireless modem 18 or a wireless personal data assistant 15 communicate to a wireless network 20 in accordance with the CDMA or TDMA standards using known wireless communications techniques. In the present context, the personal data assistant 15 and the laptop computer 16 are remote wireless devices that are capable of having data connections to a data network 80 over the wireless network 20. While the laptop computer 16 and the personal data assistant 15 are described herein as examples of remote wireless devices, those of ordinary skill in the art will appreciate that any suitable data communications device may also be used.

The wireless network 20 includes a base station controller (BSC) 22 and a switch center, which is a mobile switch center (MSC) 30. The base station controller 22 and the mobile switch center 30 are elements of the wireless telecommunications network 20 that provide public switched telephone network connectivity, control functions and switching functions for the wireless users. In the embodiment of FIG. 1, the BSC 22 is connected to the MSC 30 via a first high-speed telephone line (T1) line 25. The MSC 30 places data from the remote wireless users onto a second high-speed telephone line (T1) 35 for transmission to an inter-working gateway 40. One of ordinary skill in the art will appreciate that any high-speed link may be used for the connections at 25 and 35. In one preferred embodiment, a Frame Relay data link is used over the T1 lines 25 and 35.

In a preferred embodiment, the inter-working gateway 40 comprises an integrated network access server such as the Total Control Network Enterprise Hub of 3Com Corporation, modified to interface with the MSC 30 over the second T1 line 35. The inter-working gateway 40 performs tunneling, authentication and accounting functions, and includes a data flow controller (described below) for controlling the flow of data to the remote wireless users in accordance with embodiments of the present invention The inter-working gateway 40 functions as a gateway between the wireless network 20 and a data network 80, such as the Internet, a corporate LAN/WAN, a backbone network for an ISP (Internet Service Provider) or other computer network. The inter-working gateway 40 provides the functions needed for the remote wireless devices 15, 16 to communicate with terminal equipment connected to the public switched telephone network 60 and the data network 80. For example, the inter-working gateway 40 provides the remote wireless devices 15, 16 with access to a computer 90 connected to the public switched telephone network 60 via a modem 92. In one presently preferred embodiment, the inter-working gateway 40 is installed at the telephone company central office and managed by an Internet Service Provider. The inter-working gateway 40 receives calls from wireless users at wireless devices 15, 16 via the MSC 30 as local calls on the T1 line 35. The inter-working gateway 40 may be connected to an authentication server 50 to assist in setting up calls from the wireless remote users at 15, 16.

In a preferred embodiment, the inter-working gateway 40 is a robust communications platform such as the Total Control Enterprise Network Hub incorporating an integral general purpose computing platform, i.e., the EdgeServer™ card commercially available from 3Com. This product also allows the communications chassis to run a commercially available stand-alone operating system, such as Windows NT™ from Microsoft Corporation, as well as other remote access software products such as RADIUS (Remote Authentication Dial-in User Service). In the above-described Internet access methods, the accounting and authentication functions are preferably employed using the RADIUS protocol, which is a widely known protocol described in Request for Comments (RFC) 2058, January 1997, or other commercially available or known accounting software programs.

In accordance with a preferred embodiment of the present invention, the network 10 shown in FIG. 1 includes a system for controlling the flow of data from the data network 80 to the MSC 30. The system for controlling the flow of data prevents the overflow of the buffers in the MSC 30. Although embodiments of the present invention may be employed to provide flow control in either direction of data flow, it is the flow of data in the downstream direction (from data network 80 to the remote wireless devices 15, 16) that is controlled in the network 10 in FIG. 1. This is because the volume of data flowing in the downstream direction is typically greater than the volume of data flowing in the upstream direction (remote wireless devices 15, 16 to the data network 80). The volume of data in the upstream direction typically includes requests for data or responses to queries. The data in the downstream direction, however, includes the data requested, which may involve large amounts of data comprising graphical image data or data that is to be stored in files.

Figure 2:
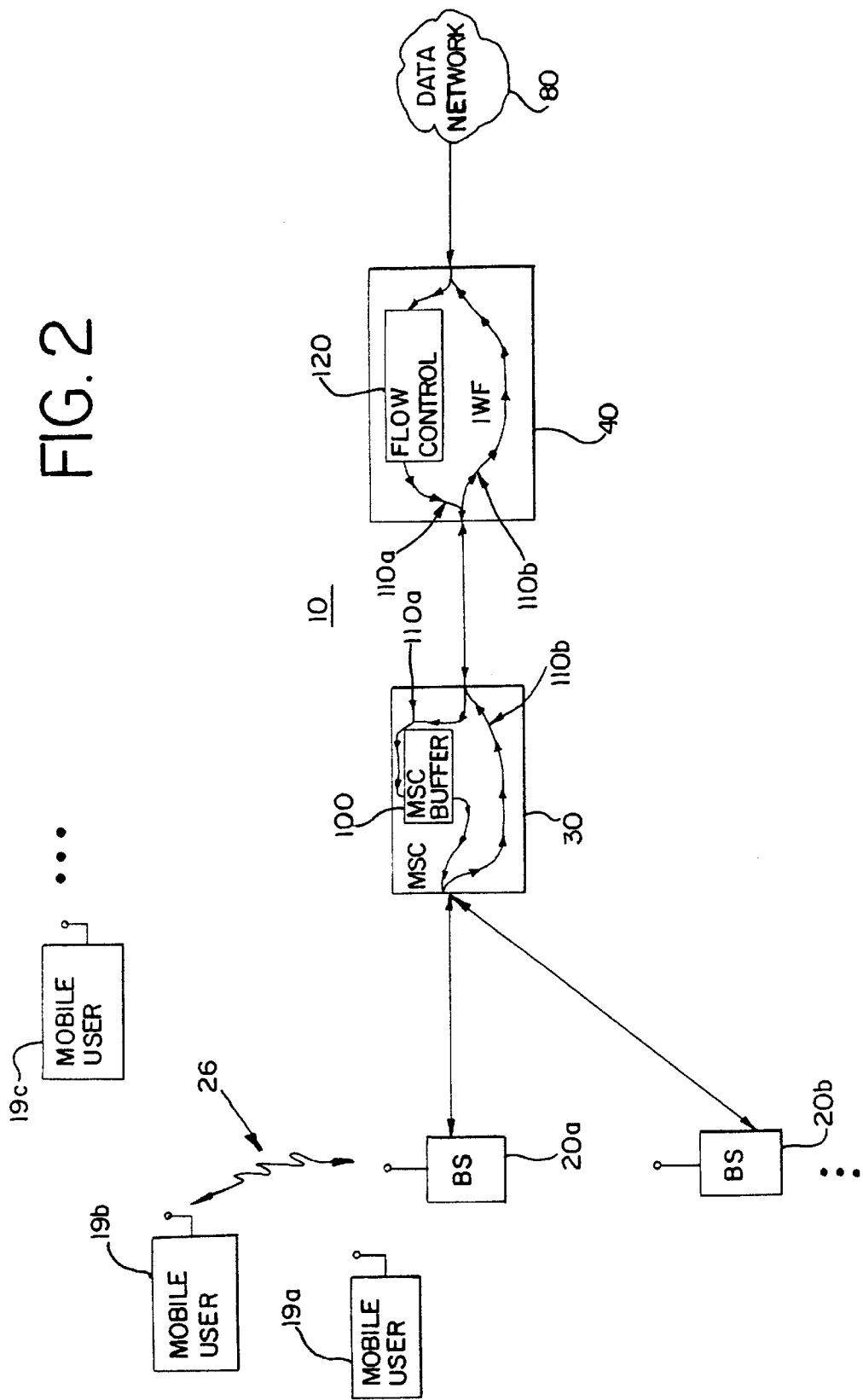
FIG. 2 is block diagram showing a connection between a data network and a wireless user using the system shown in FIG. 1.

FIG. 2 is a block diagram showing the flow of data between the mobile user 16 and the data network 80. Data is sent from the data network 80 in the downstream direction to the interworking gateway 40. The data is processed by a data flow controller 120 in the interworking gateway 40. The data flow controller 120 controls the data being transmitted to the MSC 30 from the interworking gateway 40 at 110*a*. The MSC 30 includes a mobile switch center buffer 100 to store data flowing in the downstream direction to the mobile user 16. The MSC 30 may be connected to more than one base station controller 20*a* et seq. and each base station controller 20 may be connected to a plurality of mobile users 19*a* et seq. via an air link 26. Because the MSC 30 communicates data to more than one mobile user 19*a* et seq., the MSC buffer 100 ensures that no data is lost when a large number of mobile users 19*a* et seq. are receiving data.

The MSC 30 may include existing equipment installed for purposes of providing cellular telephony connections. While the MSC 30 includes the MSC buffers 100, the size of the MSC buffer 100 may not be large enough to provide buffering for downstream data from the data network 80. The data flow controller 120 ensures that the MSC buffer 100 does not overflow by determining an available buffer size. The data flow controller 120 only permits gateway data transmissions having a gateway data size that is the same or smaller than the available buffer size.

In a preferred embodiment, the data flow controller 120 is provided with data representing a maximum MSC buffer size and an airlink data rate. The maximum MSC buffer size may be a fixed quantity that may be communicated to the interworking gateway 40 or provided during a configuration. The airlink data rate represents the data rate at which data may be transmitted from the MSC 30 to the mobile user 19*b* (mobile user 19*b* is used as an example in the present description). The airlink data rate may also be provided during configuration or communicated to the interworking gateway 40.

In alternative embodiments of the present invention, information may be provided to the interworking gateway 40 to enable it to calculate expected values for both the maximum MSC buffer size and the airlink data rate. For example, the interworking gateway 40 may receive traffic information and a formula to calculate an airlink data rate that is slower due to heavy traffic. Also, the interworking gateway 40 may determine a probability of transmission error, which may be used to determine a percentage of data that may require retransmission.

The data flow controller 120 uses the maximum MSC buffer size and the airlink data rate to determine the available buffer space and to continually update the available buffer space by determining the amount of data transmitted to the mobile user 19*a* during any given time period.

Figure 3:
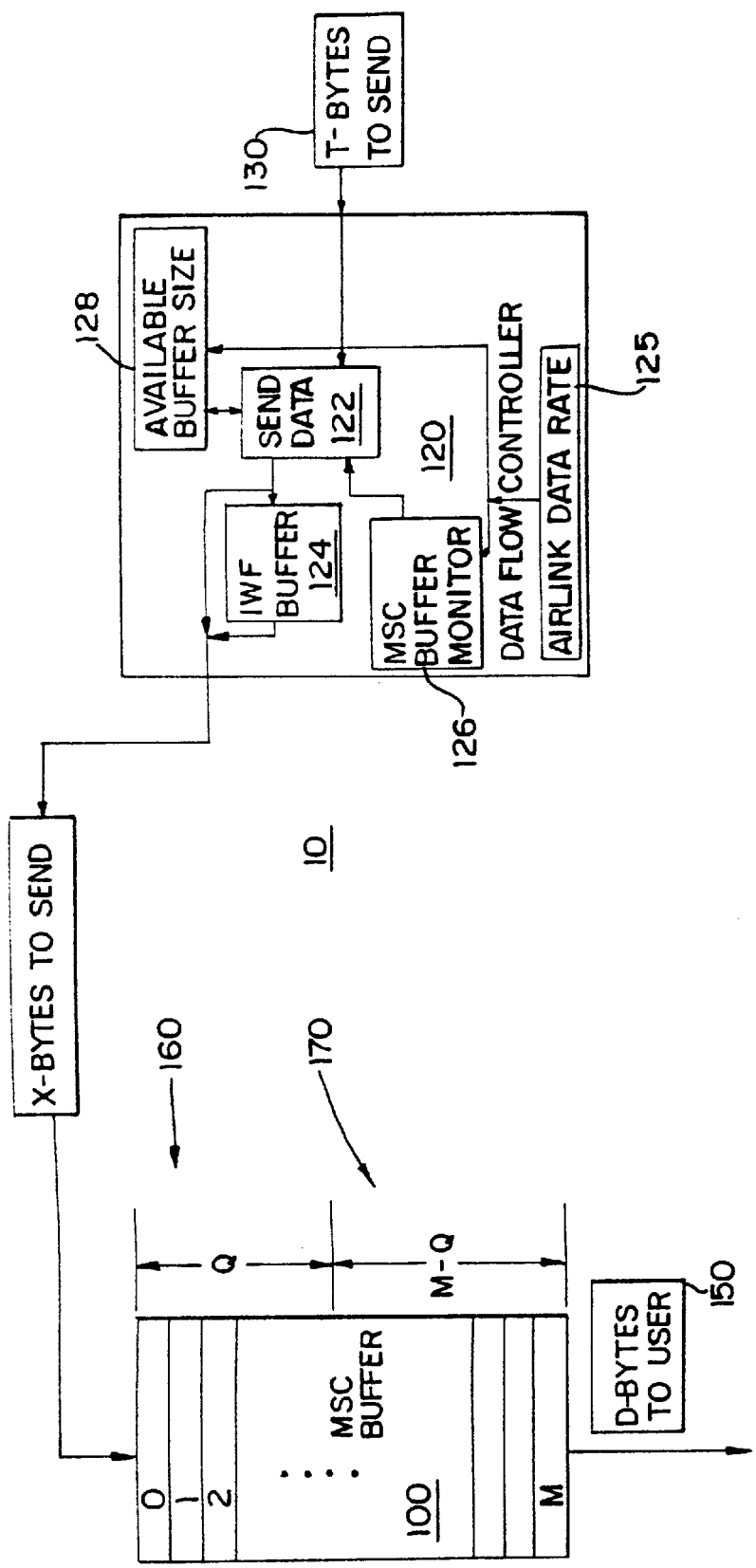
FIG. 3 is a block diagram of a system for controlling data flow over the connection in FIG. 2 according to an embodiment of the present invention.

FIG. 3 shows a block diagram of a network data transmission 130, the data flow controller 120, a gateway data transmission 140, the MSC buffer 100 and a switch data transmission 150. The network data transmission 130 is received by the data flow controller 120 from the data network 80 (shown in FIG. 2). A send data routine 122 attempts to send the data received at the network data transmission 130 to the MSC 40. Before the data is sent, however, the send data routine 122 checks the available buffer size 128 to determine if the MSC buffer 100 has enough space to receive data from the gateways 40. If the available buffer size 128 indicates that the MSC buffer 100 has space for more data, the send data routine 122 determines the gateway data size of X bytes to send on the gateway data transmission 140 where X is less than or equal to the available buffer size 128. The send data routine 122 then updates the available buffer size 128 to indicate that it is reduced by the gateway data size of the gateway data transmission 140. If the gateway data size is less than the network data size of the network data transmission 130, the send data routine 122 stores the remaining data in an interworking gateway buffer 124.

The data flow controller 120 also includes an MSC buffer monitor 126 to update the available buffer size at, preferably, regular time periods. In a preferred embodiment, a routine executes in response to the countdown of a timer that is set to count down at regular intervals to update the available buffer size 128. The routine in the MSC buffer monitor 126 determines the switch data size 150 by multiplying the airlink data rate 125 by the elapsed time period. By updating the available buffer size 128 periodically, the data flow controller 120 can determine the gateway data size such that the gateway data transmission 140 will not result in an overflow of the MSC buffer 100.

The effect of the operation of the data flow controller 120 is illustrated by the MSC buffer 100 in FIG. 3. The MSC buffer 100 includes an available buffer space 160 and a used buffer space 170. The MSC buffer 100 has a maximum buffer size of M. At any given time, the available buffer space 160 has an available buffer size Q and the used buffer space 170 has a used buffer size of M–Q. The data flow controller 120 continually monitors the value of Q to preclude the interworking gateway 40 from sending a gateway data transmission 140 that is greater than Q. As long as Q is not equal to M, the MSC 30 sends switch data transmissions 150. After each periodic interval the MSC buffer monitor 126 adjusts the available buffer size 128 to reflect the value of Q after one or more switch data transmissions 150.

Figure 4A:
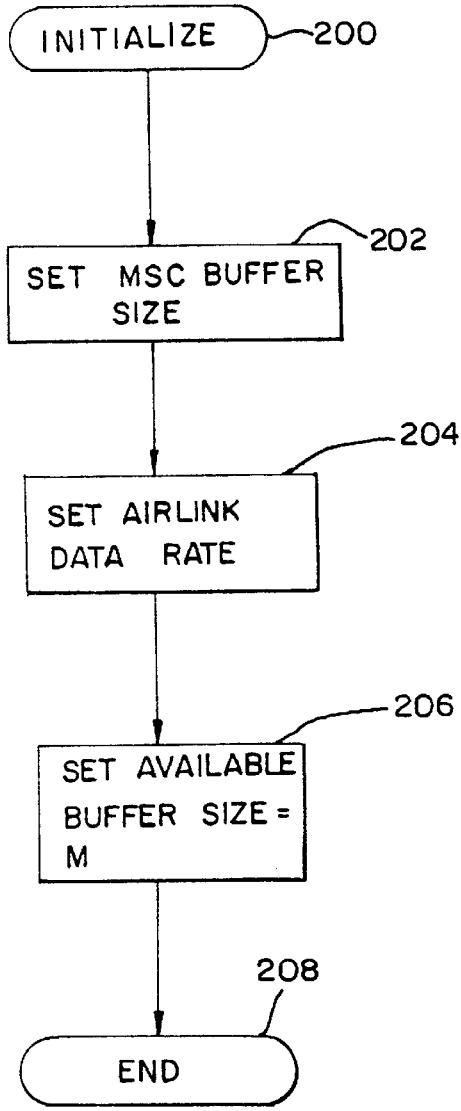
FIGS. 4A through 4C are flowcharts showing an example of a method for controlling data flow in the system shown in FIG. 1.
Figure 4B:
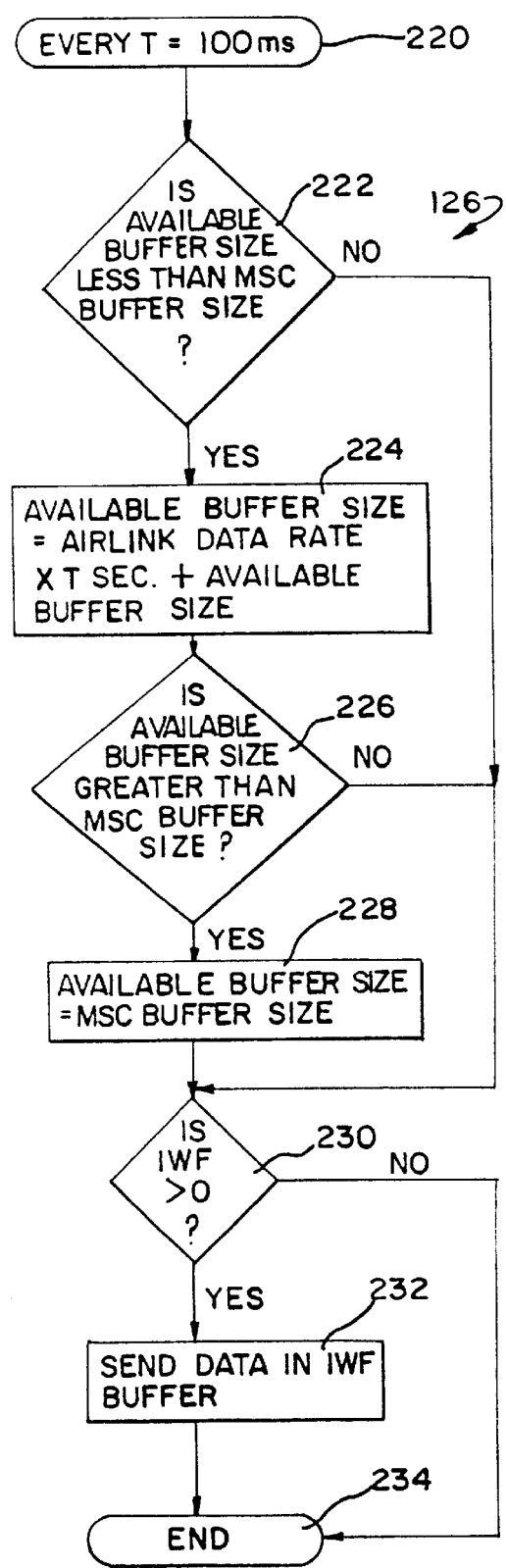
Figure 4C:
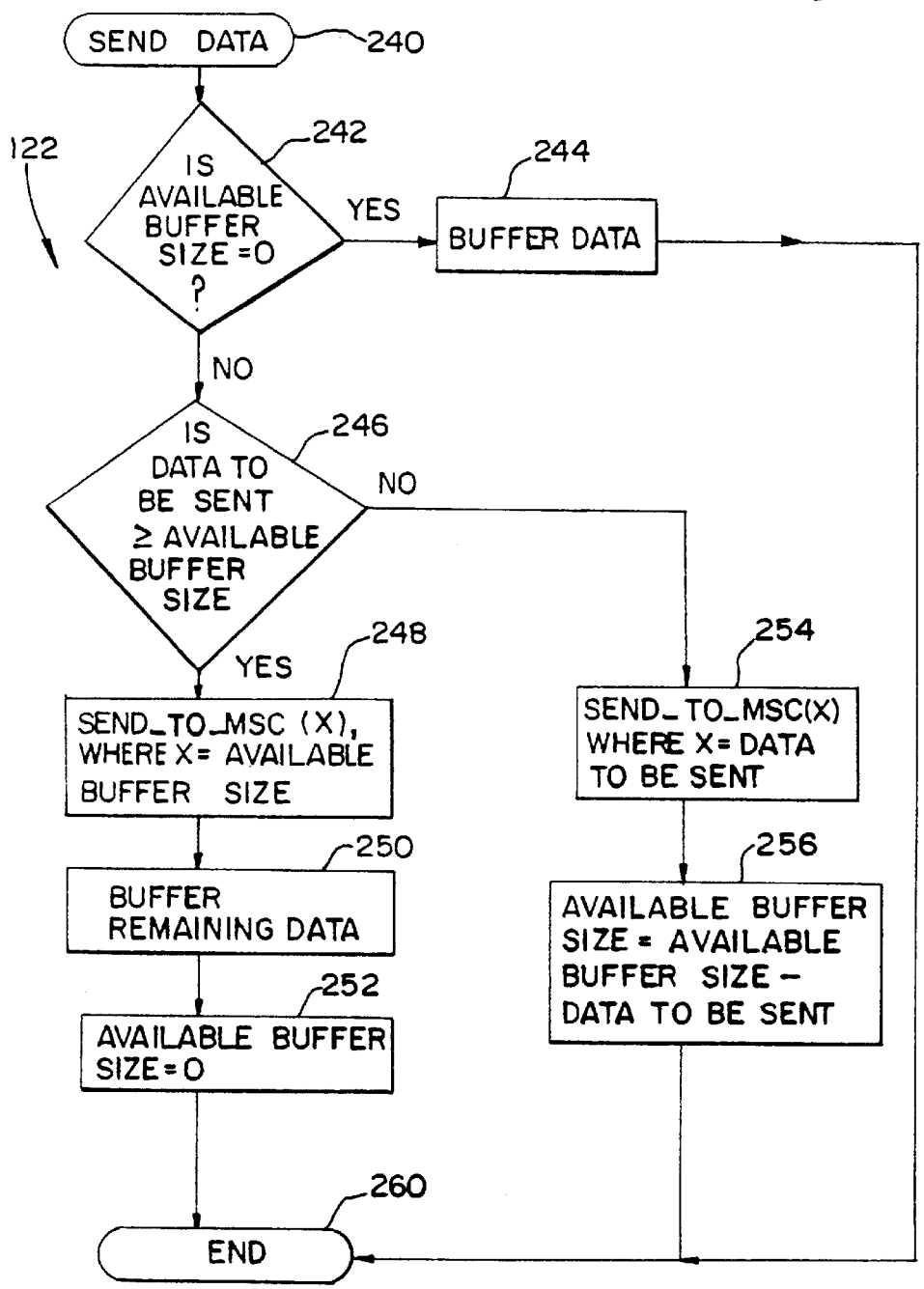

FIGS. 4A through 4C are flowcharts showing a preferred embodiment of a method for controlling the data flow from a data network to a mobile user over a wireless link. The method shown in FIGS. 4A through 4C is preferably performed using the system shown in FIG. 3. However, any suitable system and network architecture may be used as well.

The flowchart in FIG. 4A shows an initialization procedure for the data flow controller 120 shown in FIG. 3. The initialization procedure may be performed during the system initialization of the interworking gateway 40 starting at step 200. At step 202, the data flow controller sets a mobile switch controller buffer size. The MSC buffer size is a constant value shown as M in FIG. 3 and represents the maximum amount of data that may be stored in the MSC buffer. At step 204, the data flow controller sets the airlink data rate to the expected data rate of data transmission from the MSC to the mobile user. At step 206, the data flow controller 120 (shown in FIG. 3) sets the available buffer size to the MSC buffer size. Since no data has been transmitted yet, the available buffer size is the entire MSC buffer. The initialization procedure then completes at step 208.

Referring to FIG. 4B, the MSC buffer monitor 12126 executes every T=100 milliseconds as shown at step 220. The MSC buffer monitor determines at decision block 222 whether the available buffer size is less than the MSC buffer size. If the available buffer size is less than the MSC buffer size, the MSC buffer has data to transmit to the mobile user. Because the transmission of data to the mobile user opens space in the MSC buffer, the available buffer size is adjusted to show the availability of more space as shown in step 224. The available buffer size is adjusted by adding to it the airlink data rate multiplied by (T milliseconds/1000) seconds.

The available buffer space is again compared to the MSC buffer size at decision block 226 to determine whether or not it is greater than the MSC buffer size. The available buffer size cannot be greater than the MSC buffer size. If the calculation at step 224 results in an available buffer size greater than the MSC buffer size, the available buffer size is set to the MSC buffer size at step 228. If the available buffer size is less than or equal to the MSC buffer size, the interworking buffer 124 (shown in FIG. 3) is checked for data to be transmitted to the MSC 40 at decision block 230. If the interworking gateway buffer contains data, the send data routine 122 in the data flow controller 120 (shown in FIG. 3) is executed at step 232. The MSC buffer monitor 126 ends at step 234 and repeats execution again in T=100 milliseconds.

FIG. 4C shows a flowchart of the send data routine 122. The send data routine 122 executes whenever the interworking gateway 40 has data to transmit to the MSC 30. The send data routine 122 in FIG. 4C determines at decision block 242 whether there is any space at all in the MSC buffer. Although decision block 242 shows a test for a quantity of 0 bytes as the available buffer size of the MSC buffer, a test for any value indicative of a full MSC buffer can be used. If there is no available space in the MSC buffer, the send data routine buffers the data at step 244 by storing the data in the interworking gateway buffer 124 shown in FIG. 3. The send data routine then exits at step 260.

If the available buffer size indicates that the MSC can accept data, the amount of data that is to be sent is compared at decision block 246 with the available buffer size. If the data to be sent is not greater than the available buffer size, all of the data to be sent is sent to the MSC at step 254. At step 256, the available buffer size is adjusted by decreasing it by the amount of data that was sent at step 254.

If, at the decision block 246, more data is available to be sent than can be stored by the MSC buffer, the gateway data size X is set to the available buffer size and a send_to_MSC routine is called at step 248. At step 250, the remaining data is stored in the interworking gateway buffer 124. At step 252, the available buffer size is set to zero and the send data routine exits at step 260.

The method shown in FIGS. 4A though 4C and the system described in FIG. 3 advantageously control the flow of data between the mobile switch center and the mobile user. By not sending more data than the mobile switch center can buffer, the buffer overruns are prevented.

Figure 5:
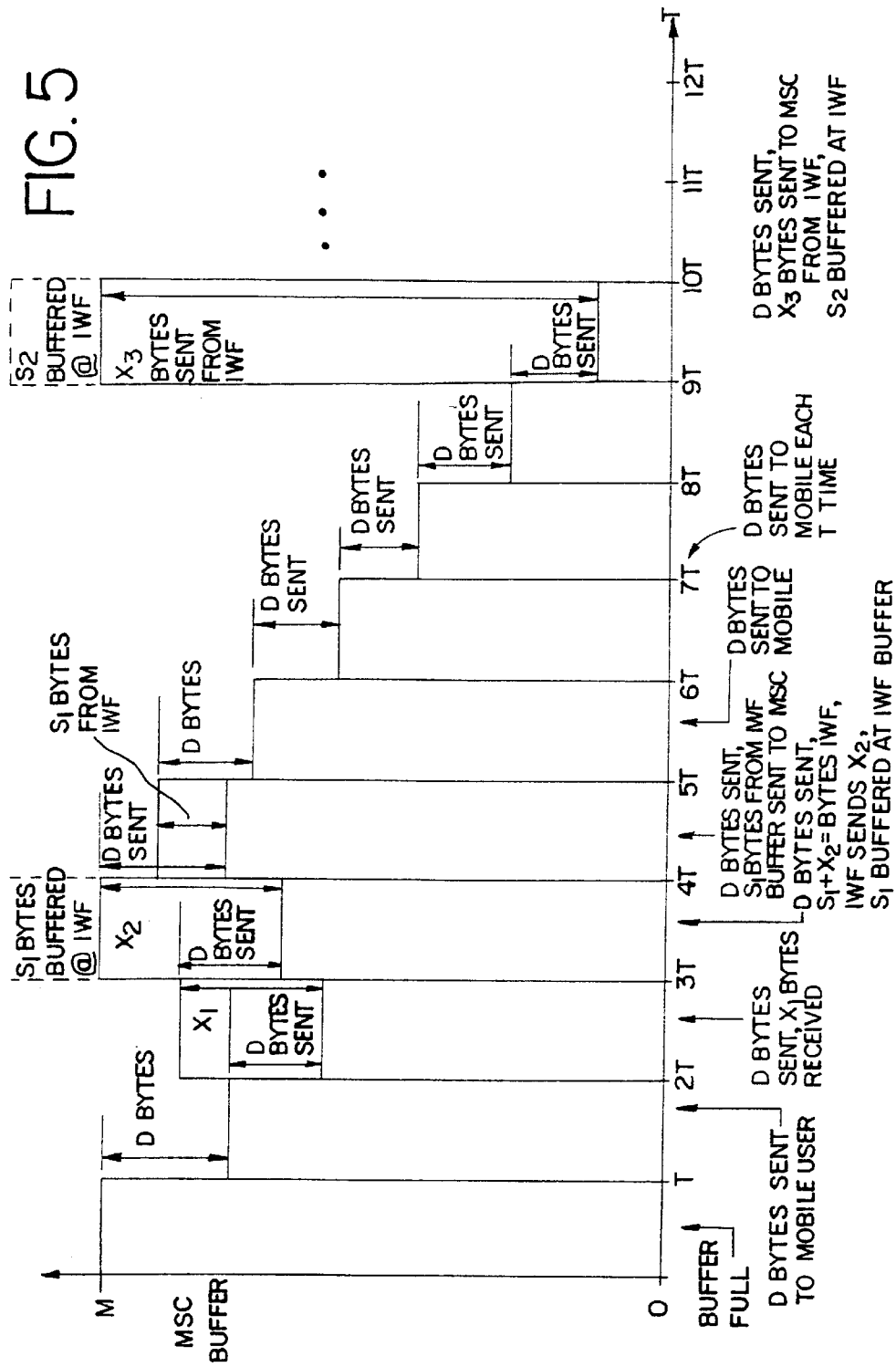
FIG. 5 is a graph showing an example of the state of the mobile switch buffer over time as data is received from the data network.

FIG. 5 shows the state of the mobile switch center buffer at each of a sequence of time slots. At the first time slot T(i.e. ending at time T), the MSC buffer is shown as full. At the second time slot 2T, D bytes have been sent to the mobile user resulting in a decrease in the amount of data in the mobile switch center buffer by D bytes. At time slot 3T, another D bytes have been sent to the mobile user and X bytes have been received at the MSC buffer. The D bytes sent in each of time slots T through 4T represent the amount of data that can be sent from the MSC to the mobile user given the airlink data rate.

The amount of data in the MSC buffer is shown at the third time slot to reflect the D bytes sent and $X_1$ bytes being received. At time slot 4T, D bytes have been sent again. As long as the MSC buffer data has data in it, the data flow controller determines that D bytes will be sent. At time slot 4T, the D bytes are sent and $S+X_2$ bytes are received at the interworking gateway. The interworking gateway sends $X_2$ bytes because anymore than that would cause the MSC buffer to overflow. At time slot 4T, $X_2$ represents the available buffer size determined by the data flow controller. Once the $X_2$ bytes are sent to the MSC, the available buffer size is set to indicate that there is no space available in the MSC buffer. The S bytes that are not sent to the MSC, are stored in the interworking gateway buffer.

At time slot 5T, D bytes are sent to the mobile user and S bytes from the interworking gateway buffer are received from the interworking gateway. At time slot 6T, the D bytes are sent to the mobile and the data in the MSC buffer is reduced by D bytes. Between time slots 6T and 9T, no data is received from the interworking gateway so that the amount of data in the MSC buffer is reduced by D bytes after each time slot. At the time slot 10T, D bytes are sent to the mobile user, however, $S_2+X_3$ bytes are sent to the inter-working gateway. $X_3$, which is the available buffer size at the tenth time slot, are sent to the MSC from the interworking gateway. $S_2$ bytes are the remaining data that is buffered at the interworking gateway.

The advantage of the system and methods described above, is that the maximum buffer size of the MSC buffer 100 (shown in FIG. 2) may be adjusted according to a retransmission percentage. The interworking gateway may receive information regarding the potential for transmission errors between the MSC and the mobile user. The inter-working gateway may then determine a percentage of expected retransmissions and use the percentage to ensure that enough space remains in the MSC buffer to accommodate data remains for retransmission.

While the invention has been described in conjunction with presently preferred embodiments of the invention, persons of skill in the art will appreciate that variations may be made without departure from the scope and spirit of the invention. For example, while processing elements and methods above have been described as determining available buffer space in the mobile switch center 30, one of ordinary skill in the art will appreciate that processing elements and methods that determine un-available, or used, buffer space fall under the scope of the present invention. As a further example, while the best mode known to the inventors for practicing the invention has been disclosed in the context of present or proposed commercial products of the applicants' assignee, it will be appreciated that the teachings are readily adaptable to other types of network access servers marketed by others in the industry, such as Lucent Technologies, Cisco Systems, etc. This true scope and spirit is defined by the appended claims, interpreted in light of the foregoing.

We claim:

1. A system for controlling data flow to a wireless user over a wireless network comprising:

an inter-working gateway connected to a data network, the inter-working gateway being operable to receive a plurality of network data transmissions, each having a network data size, from the data network for sending to the wireless user;

a switch center connected to the inter-working gateway for receiving a plurality of gateway data transmissions, each having a gateway data size, from the inter-working gateway for sending to the wireless user, the switch center including a switch buffer for storing data from the plurality of gateway data transmissions, the switch buffer having a switch buffer size;

a wireless link for communicating a plurality of switch data transmissions, each having a switch data size, between the wireless user and the switch center; and a data flow controller in the inter-working gateway for controlling the gateway data size of the gateway data transmissions by determining an available buffer size in the switch buffer;

wherein the gateway data size is less than or equal to the available buffer size.

2. A system as claimed in claim 1 wherein the data flow controller includes data flow processing elements for determining the available buffer size by calculating the switch buffer size during a time period.

3. A system as claimed in claim 2 wherein the wireless link has an airlink data rate and the data flow processing elements determine the switch data size using the airlink data rate.

4. A system as claimed in claim 3 wherein the data flow controller includes a timer to count down time periods, wherein, after each subsequent time period, the data flow processing elements determines the switch data size and calculates the available switch buffer size by adding the switch data size to the available buffer size.

5. A system as claimed in claim 4 wherein:

the data flow processing elements determine a retransmission percentage of data units that result in a transmission error and require retransmission from the switch center to the wireless user; and the data flow processing elements calculate the available switch buffer size by subtracting the retransmission percentage of data units from the switch data size.

6. A system as claimed in claim 1 wherein:

the inter-working gateway includes an inter-working buffer; and wherein:

the data flow controller stores, when the network data size is greater than the gateway data size, a remaining data from the network data transmission in the inter-working buffer.

7. A system as claimed in claim 5 wherein the inter-working gateway is operable to send the gateway data transmission using the remaining data in the inter-working buffer after each elapsed time period.

8. A system as claimed in claim 1 wherein the data network is the Internet.

9. An improved network access server connected to a data network and to a mobile switch center in a wireless network, the switch center connected to at least one wireless user via a wireless link, the network access server being operable to receive a network data transmission from the data network and to send a gateway data transmission to the switch center, the switch center being operable to receive the plurality of gateway data transmissions and to send a plurality of switch data transmissions to the wireless user, the wireless link having an airlink data rate, the mobile switch center including a switch buffer for storing the switch data transmissions being sent to the wireless user, the switch buffer having a switch buffer size, the improvement comprising:

a data flow controller for determining a gateway data size for the gateway data transmissions to send to the switch center by determining an available buffer size in the switch buffer;

wherein the switch data size is less than or equal to the available buffer size.

10. An improved network access server as claimed in claim 9 wherein the data flow controller includes data flow processing elements for determining the available buffer size by calculating the switch data size during a time period.

11. An improved network access server as claimed in claim 10 wherein the wireless link has an airlink data rate and the data flow processing elements determine the switch data size using the airlink data rate.

12. An improved network access server as claimed in claim 11 wherein the data flow controller includes a timer to count down time periods, wherein, after each subsequent time period, the data flow processing elements determines the switch data size and calculates the available switch buffer size by adding the switch data size to the available buffer size.

13. An improved network access server as claimed in claim 12 wherein:

the data flow processing elements determine a retransmission percentage of data units that result in a transmission error and require retransmission from the switch center to the wireless user; and the data flow processing elements calculate the available switch buffer size by subtracting the retransmission percentage of data units from the switch data size.

14. An improved network access server as claimed in claim 9 wherein:

the network access server includes an inter-working buffer; and wherein:

the data flow controller stores, when the network data size is greater than the gateway data size, a remaining data from the network data transmission in the inter-working buffer.

15. An improved network access server as claimed in claim 13 wherein the inter-working gateway is operable to send the gateway data transmission using the remaining data in the inter-working buffer after each elapsed time period.

16. A method for controlling a flow of data between a switch center and a wireless user in a wireless network receiving data from a data network, the method comprising the steps of:

receiving a plurality of network data transmissions at an inter-working gateway;

determining a gateway data size for transmitting a gateway data transmission by determining an available buffer size for a switch buffer in the switch center, the gateway data size being less than or equal to the available buffer size;

sending the gateway data transmission of the gateway data size; and periodically, adjusting the available buffer size.

17. A method as claimed in claim 16 wherein the step of adjusting the available buffer size includes the steps of:

determining a switch data size for a switch data transmission by the switch center to the wireless user; and adding the switch data size to the available buffer size.

18. A method as claimed in claim 17 wherein the step of determining the switch data size includes the step of multiplying an airlink data rate by a time period since the previous adjustment.

19. A method as claimed in claim 16 wherein the step of adjusting the available buffer space includes the steps of:

determining a retransmission percentage of the switch data transmission that, in a previous switch data transmission, may have had a transmission error; and adjusting the available buffer space for the retransmission percentage.

20. A method as claimed in claim 16 wherein the step of determining the gateway data size of the gateway data transmission includes the step of storing a remaining data in an inter-working buffer when the gateway data size is less than a network data size of the network data transmission.

* * * * *